US008370430B2

(12) United States Patent
Mateu

(10) Patent No.: US 8,370,430 B2
(45) Date of Patent: Feb. 5, 2013

(54) METHOD FOR INTERCHANGING MESSAGES AND INFORMATION DURING A TELEPHONE CONFERENCE

(75) Inventor: Jordi Mateu, Puigcerda (ES)

(73) Assignee: Siemens Enterprise Communications GmbH & Co., KG, Munich (DE)

( * ) Notice: Subject to any disclaimer, the term of this patent is extended or adjusted under 35 U.S.C. 154(b) by 2748 days.

(21) Appl. No.: 10/119,573

(22) Filed: Apr. 9, 2002

(65) Prior Publication Data

US 2003/0053423 A1 Mar. 20, 2003

(30) Foreign Application Priority Data

Apr. 9, 2001 (DE) .................................. 101 17 679

(51) Int. Cl.
*G06F 15/16* (2006.01)
(52) U.S. Cl. ........................................ 709/204; 709/205
(58) Field of Classification Search .......... 709/204–207, 709/225–227
See application file for complete search history.

(56) References Cited

U.S. PATENT DOCUMENTS

| | | | |
|---|---|---|---|
| 4,577,065 A | 3/1986 | Frey et al. | |
| 5,764,731 A * | 6/1998 | Yablon | 379/88.15 |
| 5,818,836 A | 10/1998 | DuVal | 370/389 |
| 5,916,302 A * | 6/1999 | Dunn et al. | 709/204 |
| 5,949,763 A * | 9/1999 | Lund | 370/261 |
| 6,011,782 A * | 1/2000 | DeSimone et al. | 370/260 |
| 6,061,761 A | 5/2000 | Bachmat | |
| 6,072,780 A | 6/2000 | Johnson, Jr. et al. | 370/260 |
| 6,081,830 A | 6/2000 | Schindler | |
| 6,163,692 A * | 12/2000 | Chakrabarti et al. | 455/416 |
| 6,262,978 B1 * | 7/2001 | Bruno et al. | 370/260 |
| 6,266,328 B1 * | 7/2001 | Johnson et al. | 370/260 |
| 6,272,214 B1 * | 8/2001 | Jonsson | 379/202.01 |
| 6,304,648 B1 * | 10/2001 | Chang | 379/202.01 |
| 6,381,320 B1 * | 4/2002 | Creamer et al. | 379/201.01 |
| 6,628,767 B1 * | 9/2003 | Wellner et al. | 379/202.01 |
| 6,665,392 B1 * | 12/2003 | Wellner et al. | 379/204.01 |
| 6,671,262 B1 * | 12/2003 | Kung et al. | 370/260 |
| 6,768,722 B1 * | 7/2004 | Katseff et al. | 370/260 |
| 6,782,413 B1 * | 8/2004 | Loveland | 709/204 |
| 6,810,116 B1 * | 10/2004 | Sorensen et al. | 379/202.01 |

(Continued)

FOREIGN PATENT DOCUMENTS

| | | |
|---|---|---|
| EP | 0817457 A2 | 1/1998 |
| EP | 0 903 921 | 3/1999 |

(Continued)

OTHER PUBLICATIONS

TDB: Simple Multimedia Conferencing—pp. 1-2.

(Continued)

*Primary Examiner* — Minh-Chau Nguyen
(74) *Attorney, Agent, or Firm* — King & Spalding L.L.P.

(57) ABSTRACT

A method and a telecommunications system for interchanging messages and information during a telephone conference, with the telephone conference taking place via a telephone network and the telephone conference being assigned a code which can be predetermined, and from which a password is derived which allows the subscribers to the telephone conference access to a communication platform which is based on a data network, for the purpose of interchanging data during the telephone conference.

22 Claims, 3 Drawing Sheets

U.S. PATENT DOCUMENTS

| | | | |
|---|---|---|---|
| 6,836,478 B1* | 12/2004 | Huang et al. | 370/352 |
| 6,883,015 B1* | 4/2005 | Geen et al. | 709/203 |
| 6,895,558 B1* | 5/2005 | Loveland | 715/746 |
| 6,904,110 B2* | 6/2005 | Trans et al. | 375/350 |
| 6,961,416 B1* | 11/2005 | Summers et al. | 379/202.01 |
| 6,981,022 B2* | 12/2005 | Boundy | 709/204 |
| 7,006,455 B1* | 2/2006 | Fandrianto et al. | 370/260 |
| 7,039,040 B1* | 5/2006 | Burg | 370/352 |
| 7,237,004 B2* | 6/2007 | Slobodin et al. | 709/204 |
| 7,454,456 B2* | 11/2008 | Banerjee et al. | 709/201 |
| 8,072,780 B1 | 12/2011 | Roy | 370/260 |
| 2002/0019880 A1* | 2/2002 | Sakakura | 709/245 |

FOREIGN PATENT DOCUMENTS

| | | |
|---|---|---|
| EP | 0 912 056 | 4/1999 |
| WO | 99/20026 A1 | 4/1999 |
| WO | 99/27701 A1 | 6/1999 |

OTHER PUBLICATIONS

TDB: Telephone Conference Circuit—pp. 1-3.
Eurpoean Search Report, European Patent Application No. 02100324.9, 3 pages.

* cited by examiner

| KON | COD | PAS | TEI | ZEI | TAG |
|---|---|---|---|---|---|
| 1 | 01 | 011 | 3 | 15.35 | 3.3.2001 |
| 2 | 02 | 022 | 5 | 18.00 | 5.3.2001 |

DAT

METHOD FOR INTERCHANGING MESSAGES AND INFORMATION DURING A TELEPHONE CONFERENCE

BACKGROUND OF THE INVENTION

The present invention relates to a method for interchanging messages and information during a telephone conference in a telecommunications system using a telephone network via which the telephone conference takes place.

The present invention further relates to a telecommunications system, which is set up for interchanging messages and information during a telephone conference, using a telephone network.

Telephone conference circuits represent a frequently offered service feature from network operators and form an important component of modern business life, particularly when the geographical distance between the call partners make a personal meeting difficult or impossible.

One implementation option for a telephone conference circuit is described, for example, in IBM "Technical Disclosure Bulletin 77C 01761".

As is known, it is impossible during telephone conferences for the subscribers to interchange additional message or information material; for example, pictures or videos.

Although voice and picture data can be transmitted during video conferences, all the subscribers need to have special telecommunications devices which are set up for a video conference. However, the procurement of such telecommunications devices is associated with very high costs. Furthermore, the known video conference systems do not yet have the same characteristics as a telephone conference circuit in terms of transmission quality and connection stability.

A method for transmitting pictures via fax during a telephone conference has been known from IBM "Technical Disclosure Bulletin 95A 61562". However, this method has the major disadvantage that it is impossible to interchange video data, and the subscribers cannot "chat" to one another.

With regard to the expressions "chatting" and "chatrooms", reference should be made, for example, to U.S. Pat. No. 6,061,761, in which a "chatroom system" in a computer network is described. In this context, U.S. Pat. No. 6,081,830 has also become known which describes a method for connection to program-specific "chatrooms".

An object of the present invention is, thus, to provide a simple and cost-effective way to allow additional messages and information material to be interchanged between subscribers to a telephone conference in a simple manner during that telephone conference.

SUMMARY OF THE INVENTION

According to the present invention, this object is achieved by a method wherein the telephone conference is assigned a code which can be predetermined, in which the telephone conference is allocated a communication platform, which is based on a data network and offers services for message/information transmission in the form of data between the subscribers to the telephone conference. This communication platform is accessed via a password which is derived from the code and is transmitted together with an access address for the communication platform to the subscribers to the telephone conference. In this platform, the subscribers must transmit the password via the data network to the access address in order to gain access to the communication platform and in order to interchange messages and information with one another via the at least one service of this communication platform.

The present invention allows one or more services which are offered by a communication platform to be used for message/information transmission during a telephone conference, in parallel to voice transmission via a telephone network. The method according to the present invention makes it possible, without any major complexity or cost, to interchange data, such as picture data, between the subscribers during the telephone conference. Access protection via a teleconference-specific password to the communication platform ensures that no unauthorized subscribers to the telephone conference have access to the data and information being interchanged.

One embodiment of the present invention, which is simple to implement, has the communication platform being part of a call center.

Another embodiment of the present invention provides for the data network to be the Internet, and for the access address to be an IP address.

Furthermore, an access server can be provided which provides access to the communication platform.

Further advantages can be achieved by the communication platform providing a service for a data conference circuit.

One embodiment of the present invention which has been proven in practice provides for the communication platform to provide a service which allows the subscribers to chat to one another.

It is particularly advantageous for the communication platform to provide a service which allows picture and/or video data to be transmitted.

The communication platform advantageously provides a service which allows e-mails to be transmitted and/or received.

In order to find out the subscribers to whom data already can be transmitted, an indication is given to a subscriber of which of the other subscribers likewise have access to the at least one service.

A telecommunications system of the type initially described is particularly suitable for carrying out the method according to the present invention which is set up to assign a code which can be predetermined to the telephone conference. The telephone conference is allocated a communication platform which is based on a data network and has services for message/information transmission in the form of data between subscribers to the telephone conference. The telecommunications system is set up to protect access to this communication platform via a password, to derive the password from the code, and to transmit this together with an access address to the communication platform to the subscribers to the telephone conference. The communication platform is set up to provide access to the communication platform after transmission of the password via the data network from a telecommunications terminal, which is associated with the data network of a subscriber for this telecommunications terminal.

One particularly advantageous embodiment of the present invention is to provide a call center which is set up to receive a request for a telephone conference, to assign the code to the telephone conference, and to derive the password from this code.

Furthermore, the call center is set up to notify the subscribers that a telephone conference has been called, and to transmit to them the address of the access server and the password.

Additional features and advantages of the present invention are described in, and will be apparent from, the following Detailed Description of the Invention and the Figures.

DETAILED DESCRIPTION OF THE INVENTION

Figure 1:
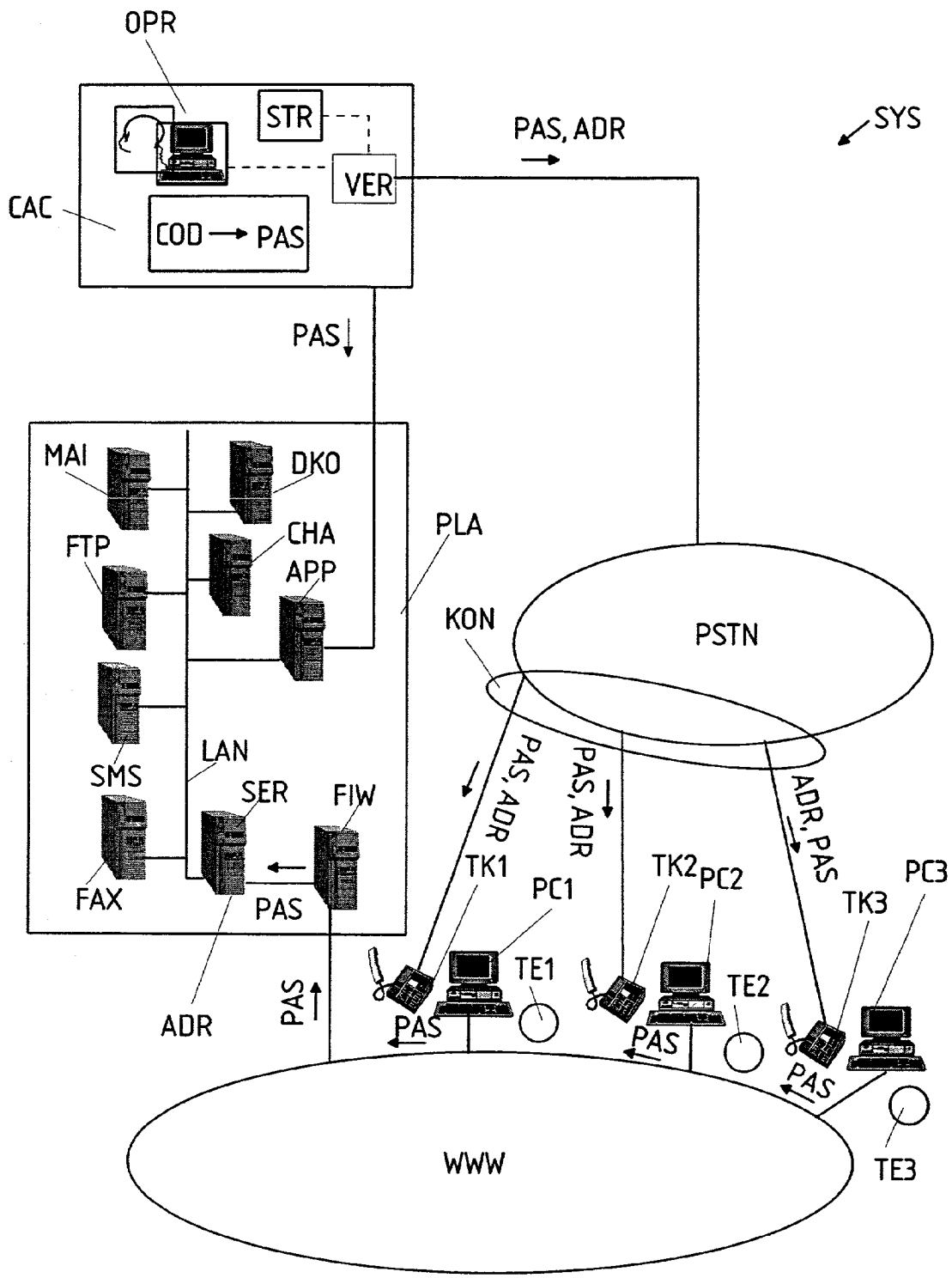
FIG. 1 shows a telecommunications system according to the present invention with a communication platform.

According to FIG. 1, a telecommunications system SYS of the invention has a call center CAC which is set up to receive a request for a telephone conference KON and to call the telephone conference KON.

The call center CAC can interchange administration data with a communication platform PLA which is based on a data network WWW; for example, the Internet.

The communication platform PLA allows subscribers TEI to a telephone conference to use data services, which the communication platform PLA provides, to mutually interchange messages and information during the telephone conference KON.

In order to prevent unauthorized use of services of the communication platform PLA and, thus, unauthorized access to the data being interchanged during the telephone conference KON, the access to the communication platform PLA is protected via a password PAS.

After receiving a request to call a telephone conference KON, this telephone conference KON is assigned a code COD. The abovementioned password PAS is then derived from this code COD, and is assigned to the communication system SYS for the purposes of the telephone conference KON.

To this end, the password PAS can be transmitted from the call center CAC via an interface to the data network WWW, to an access server SER, which provides password-protected access to the communication platform PLA. The access server SER can store the password PAS in a database DAT (see FIG. 2), and can compare it with a password PAS entered by a user for authentication purposes.

This database DAT may, for example, include the code COD for a telephone conference KON, the password PAS derived from the code, as well as the number of subscribers TEI and information about the day or date TAG and time ZEI of the telephone conference.

The password PAS and the data network address ADR of the access server SER are supplied from the call center CAC to the subscribers TE1, TE2, TE3. Each subscriber TE1, TE2, TE3 can transmit the password PAS to the IP address of the access server SER via a telecommunications terminal which is associated with the data network WWW; for example, a computer PCO which is connected to the Internet. The access server SER checks the password PAS and, provided the result of the check is positive, the subscriber TEI is given access to the communication platform PLA.

Subscribers TE1, TE2, TE3 to the telephone conference KON can interchange data with one another, in the form of pictures or text messages, once they have been given access to the communication platform PLA. The communication platform PLA also allows the subscribers TE1, TE2, TE3 to chat with one another.

The method according to the present invention will be explained in the following text for the situation where the data network WWW is the Internet.

In order to carry out the method according to the present invention, the subscriber terminal needs to have two separate telecommunications functions, one of which is set up for voice transmission via a telephone network PSTN, such as the PSTN network, while the other function is set up for interchanging data via the Internet.

In principle, it is possible to provide both functions in one terminal. However, reference is made here to an embodiment in which the two functions are associated with different telecommunications terminals, a telephone TK1, TK2, TK3 which is connected to the PSTN network, and a computer PC1, PC2, PC3 which is connected to the Internet WWW.

A first subscriber TE1 wishes to call a telephone conference KON with, for example, two other users TE2, TE3. For this purpose, he/she can, for example, call a web site of his network operator via the Internet WWW, where he/she "clicks on" a telephone conference option. In response to this, a form will appear in the browser of the first subscriber TE1, in which he/she indicates the day or date and time, as well as the number of desired subscribers TE2, TE3, their names, telephone numbers and, possibly, their e-mail addresses.

One other option is for him/her to call the call center via the PSTN network and make his/her request for a telephone conference circuit with the other subscribers TE2, TE3 by telephone.

The call center CAC makes a note of the time period for the start of the telephone conference KON as well as the names and telephone numbers, and possibly also the e-mail addresses, of the subscribers TE1, TE2, TE3 and assigns the code COD to that telephone conference KON.

This code COD is used primarily for administering telephone conferences KON in the call center CAC.

In order to make it possible to offer various services MAI, FTP, SMS, FAX, DKO, CHA during the telephone conference KON, the communication platform PLA has an application server APP, which carries out all the service control activities.

The application server APP is connected via a local area network (LAN) to the access server SER, on which, in one preferred embodiment of the present invention, a web site is stored, and via which the communication platform PLA is accessed. The application server APP is also connected to an FTP server FTP, an e-mail MAI or fax FAX, an SMS server SMS as well as a server DKO, which allows a data conference circuit for the subscribers TE1, TE2, TE3, for the communication platform PLA.

Files, picture or video data can be interchanged between the subscribers to the telephone conference via the FTP server in accordance with the FTP protocol, while e-mail messages, fax messages and SMS messages can be interchanged via the e-mail, fax and SMS servers.

A so-called "Firewall" FIW can be provided in order to protect the communication platform PLA against unauthorized access.

In principle, the communication platform PLA can be integrated in the call center CAC.

The call center CAC has a switching center VER for the PSTN network, which sets up the telephone conference circuit between the subscribers TE1, TE2, TE3.

An operator OPR or a call center CAC controller set up for this purpose, uses the telephone numbers or e-mail addresses stated by the first subscriber TE1 to transmit the IP address ADR of the server SER in which the web site is stored, and/or the IP address of the web site and the password PAS, to the subscribers TE1, TE2, TE3.

In principle, the password PAS and the IP address of the web site can be transmitted before or after the telephone conference circuit KON is set up. In order to supply the password PAS, the switching center VER can set up a connection between a controller STR for the call center CAC or an operator and the telecommunications terminals TK1, TK2, TK3, which are associated with the PSTN network, of the subscribers TE1, TE2, TE3 to the telephone conference KON.

Another option for supplying this is for the controller to supply the IP address ADR of the access server SER and the password PAS as an e-mail. The IP address ADR and the password PAS also may be transmitted in the form of an SMS or fax message.

However, it is impossible to start using the communication platform PLA until the telephone conference KON has started, since the password PAS does not become valid until the time at which the telephone conference KON is called.

The subscribers TE1, TE2, TE3 to the telephone conference KON can log into the communication platform PLA via the access server SER once they have received the password PAS and the IP address ADR by which, as already mentioned above, they are given authorization to use the services MAI, FTP, SMS, FAX, DKO, CHA of the communication platform PLA for the duration of the telephone conference KON.

Figures 2, 3:
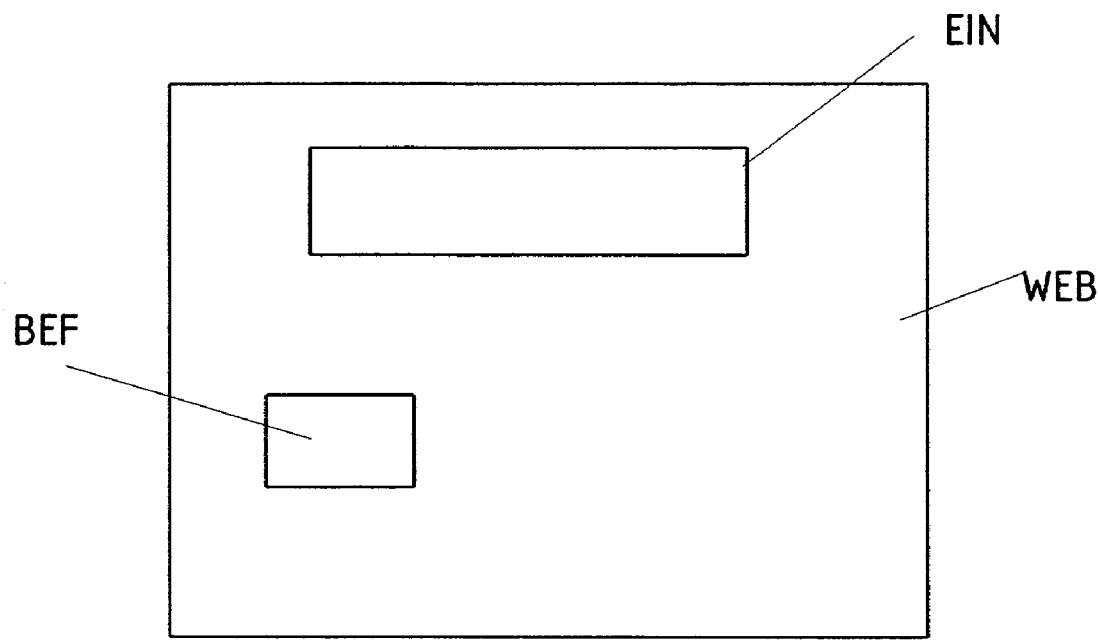
FIG. 2 shows a web site of an access server for the communication platform.
FIG. 3 shows an illustration of a user interface to the communication platform.

According to FIG. 3, and as mentioned above, the logging-in process can be carried out via a web site WEB which is stored in the access server SER. In this case, the password PAS can be entered via an appropriate input area EIN on the web site WEB. A procedure such as this is known to those skilled in the art from, for example, the initially mentioned "chatrooms".

Figure 4:
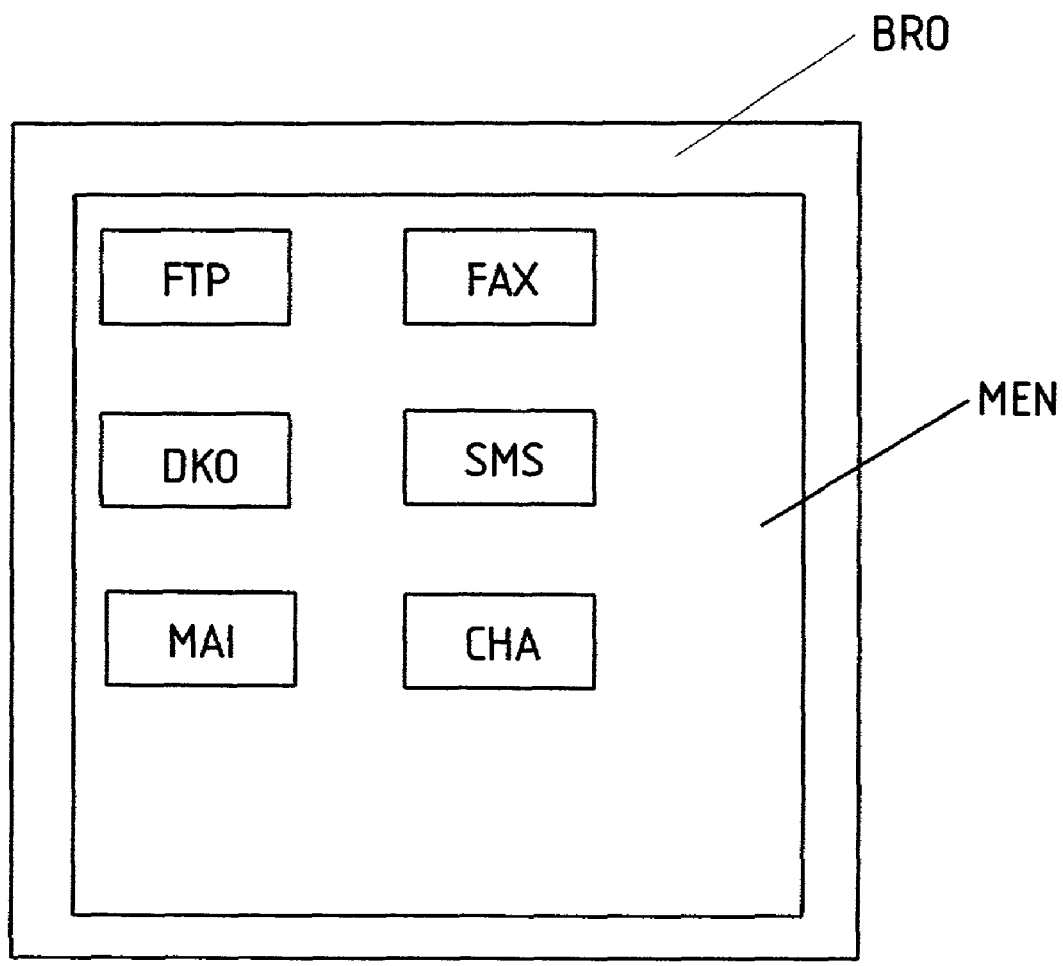
FIG. 4 shows an illustration of a further user interface to the communication platform after a subscriber has "logged in".

As shown in FIG. 4, a menu/control page may appear, for example, on the computer screen of a subscriber in an Internet browser BRW after "logging into" the communication platform PLA, on which menu/control page the names of all the subscribers TE1, TE2, TE3 who have logged in can be seen. Since the data interchange between the subscribers TE1, TE2, TE3 takes place via the communication platform PLA, there is no need for the subscribers TE1, TE2, TE3, or their telecommunications terminals PC1, PC2, PC3, to know the IP addresses of the other subscribers TE1, TE2, TE3 or of their telecommunications terminals PC1, PC2, PC3.

Various services MAI, FTP, SMS, FAX, DKO, CHA and types of transmission which are provided by the communication platform PLA can be activated via this menu/control page MEN. For example, the logged-in subscribers can decide, by clicking on an appropriate menu item on the menu/control page, whether they wish to be sent video data, picture data, text data or files. Depending on the chosen type of data to be sent, the communication platform PLA uses one of the abovementioned services MAI, FTP, SMS, FAX, DKO, CHA to carry out the data interchange between the subscribers TE1, TE2, TE3.

In the same way, by activating the appropriate menu icon CHA, it is possible to chat with one or more of the subscribers TE1, TE2, TE3, or to send fax, SMS, or e-mail messages MAI to the subscribers TE1, TE2, TE3 to the telephone conference KON.

Those skilled in the art will know numerous programs for providing the service features or services just mentioned. One such program, or communication platform, is, for example, "ICQ". Another such program is "NetMeeting", from Microsoft.

In contrast to the two programs just mentioned, there is no need in the method according to the present invention to transmit the IP address of a subscriber TE1, TE2, TE3 to the other subscribers TE1, TE2, TE3 in order to allow data to be interchanged between them. The transmission of the IP addresses of each subscriber TE1, TE2, TE3 to the other subscribers TE1, TE2, TE3 can be linked, as is known, with complications relating to data transmission and routing; particularly, when the subscribers are allocated dynamic IP addresses.

A further advantage of the method according to the present invention is that there is no need to install special software on a terminal for one of the subscribers TE1-TE3, and the access to the communication platform PLA is protected by a dynamic password that is specific to that telephone conference.

For this reason, only the (static) IP address ADR of the communication platform PLA and/or of the access server SER is transmitted to the subscribers TE1-TE3 to the telephone conference KON. The data is then interchanged via this address, that is to say the subscribers to a telephone conference KON do not need to know the IP addresses of the other subscribers TE1-TE3, in a similar way to that for the known chatting process. The onward routing of the interchanged data or messages is carried out by the communication platform PLA.

At the end of the telephone conference KON, the subscribers log off the communication platform PLA once again. The logging-off process can be carried out, for example, by clicking on an appropriate menu icon on the web site WEB, or else automatically by the call center CAC. If the logging-off process is carried out by the call center CAC, then, once the telephone conference KON has been ended, the controller STR can generate an appropriate completion signal which tells the communication platform PLA that it should no longer be available for that telephone conference.

Although the present invention has been described with reference to specific embodiments, those of skill in the art will recognize that changes may be made thereto without departing from the spirit and scope of the invention as set forth in the hereafter appended claims.

The invention claimed is:

1. A telecommunications system for interchanging messages and information during a telephone conference, using a telephone network, comprising:
   a call center comprising at least one processor device to:
      process a request for a telephone conference;
      assign a predetermined code by the telecommunications system to the conference; and
      derive a password from the predetermined code assigned to the telephone conference, wherein the password is assigned to gain access to an Internet-based data network communication platform, wherein the data network communication platform is allocated to the telephone conference, and
   wherein the data network communication platform is configured to enable services for message and information transmission in data form between subscribers to the telephone conference;
   wherein the call center is configured to transmit the password together with an IP address from the data network communication platform to the subscribers to the telephone conference;
   wherein access to the data network communication platform is restricted until the telephone conference has started by not validating the password until the telephone conference is called;
   wherein the password is received from the subscribers via the IP address to gain access to the data network communication platform during the telephone conference and to interchange messages and information with one another via at least one service of the data network communication platform.

2. A telecommunications system for interchanging messages and information during a telephone conference as claimed in claim 1, wherein the data network communication platform is part of a call center.

3. A telecommunications system for interchanging messages and information during a telephone conference as claimed in claim 2, wherein the call center receives a request for a telephone conference, assigns the code to the telephone conference, and derives the password from the code.

4. A telecommunications system for interchanging messages and information during a telephone conference as claimed in claim 3, wherein the call center notifies the subscribers that a telephone conference has been called, and transmits to the subscribers both the IP address and the password.

5. A telecommunications system for interchanging messages and information during a telephone conference as claimed in claim 2, wherein the data network communication platform provides a service for transmitting video data.

6. A telecommunications system for interchanging messages and information during a telephone conference as claimed in claim 1, further comprising an access server for providing access to the data network communication platform.

7. A telecommunications system for interchanging messages and information during a telephone conference as claimed in claim 1, wherein the data network communication platform provides a service for a data conference circuit.

8. A telecommunications system for interchanging messages and information during a telephone conference as claimed in claim 1, wherein the data network communication platform provides a service for the subscribers to chat with one another.

9. A telecommunications system for interchanging messages and information during a telephone conference as claimed in claim 1, wherein the data network communication platform provides a service for transmitting picture data.

10. A telecommunications system for interchanging messages and information during a telephone conference as claimed in claim 1, wherein the data network communication platform provides a service for transmission of e-mails.

11. A telecommunications system for interchanging messages and information during a telephone conference as claimed in claim 1, wherein in the data network communication platform indicates to a subscriber which of the other subscribers have access to the data network communication platform.

12. A method for interchanging messages and information during a telephone conference in a telecommunications system using a telephone network via which the telephone conference takes place, the method comprising:
processing a request for the telephone conference;
assigning a code to the telephone conference;
deriving a password from the code assigned to the telephone conference, wherein the password is assigned to gain access to an Internet-based data network communication platform; assigning the password to the data network communication platform; allocating the data network communication platform to the telephone conference,
wherein the data network communication platform enables services for message and information transmission in data form between subscribers to the telephone conference; transmitting the password together with an IP address of the data network communication platform to the subscribers to the telephone conference; restricting access to the data network communication platform until the telephone conference has started by not validating the password until the telephone conference is called;
receiving the password from the subscribers via the IP address to gain access to the data network communication platform during the telephone conference and to interchange messages and information with one another via at least one service of the data network communication platform;
generating automatically a completion signal to the data network communication platform once the telephone conference has ended; and disconnecting the data network communication platform after receiving the completion signal.

13. A method for interchanging messages and information during a telephone conference in a telecommunications system as claimed in claim 12, wherein the communication platform provides a service which allows transmission of e-mails.

14. A method for interchanging messages and information during a telephone conference in a telecommunications system as claimed in claim 13, the method further comprising the step of notifying the subscribers, via a call center, that a telephone conference has been called, and transmitting to the subscribers both the address and the password.

15. A method for interchanging messages and information during a telephone conference in a telecommunications system as claimed in claim 12, wherein the data network communication platform is part of a call center.

16. A method for interchanging messages and information during a telephone conference in a telecommunications system as claimed in claim 12, the method further comprising the step of providing access to the data network communication platform via an access server.

17. A method for interchanging messages and information during a telephone conference in a telecommunications system as claimed in claim 12, wherein the data network communication platform provides a service for a data conference circuit.

18. A method for interchanging messages and information during a telephone conference in a telecommunications system as claimed in claim 12, wherein the data network communication platform provides a service which allows the subscribers to chat with one another.

19. A method for interchanging messages and information during a telephone conference in a telecommunications system as claimed in claim 12, wherein the data network communication platform provides a service which allows picture data to be transmitted.

20. A method for interchanging messages and information during a telephone conference in a telecommunications system as claimed in claim 12, wherein the data network communication platform provides a service which allows video data to be transmitted.

21. A method for interchanging messages and information during a telephone conference in a telecommunications system as claimed in claim 12, the method further comprising the step of providing a subscriber with an indication of which of the other subscribers have access to the communication platform.

22. A method for interchanging messages and information during a telephone conference in a telecommunications system as claimed in claim 12, the method further comprising the step of assigning the telephone conference to a call center, the call center assigning the code to the telephone conference and using the code to derive the password.

* * * * *